UNITED STATES PATENT OFFICE.

CHARLES F. FROHE, OF BUFFALO, NEW YORK, ASSIGNOR TO SCIENTIFIC PRODUCTS COMPANY, INC., OF BUFFALO, NEW YORK, A CORPORATION OF NEW YORK.

FIREPROOFING AND WATERPROOFING COMPOSITION.

1,273,213.     Specification of Letters Patent.     Patented July 23, 1918.

No Drawing.     Application filed December 7, 1917. Serial No. 205,944.

*To all whom it may concern:*

Be it known that I, CHARLES F. FROHE, a citizen of the United States, residing at Buffalo, in the county of Erie and State of New York, have invented new and useful Improvements in Fireproofing and Waterproofing Composition, of which the following is a specification.

This invention relates to a composition of matter which is to be applied to the woodwork and textile members of aeroplanes, automobile tops, curtains, window shades, artificial wall board and the like for the purpose of filling the interstices in the same, also to render these materials water-proof, fireproof and to shrink the same so they are taut and smooth.

It is the object of this invention to produce a composition for this purpose which is effective in operation and low in cost and can also be manufactured from materials which are readily available and capable of being applied to the surfaces to be treated without requiring special skill.

My improved composition embodies in its manufacture the following ingredients in substantially the proportions given:

Starch—one-sixteenth of an ounce.
Alum—one-half of an ounce.
Glue—one-third of an ounce or one-third of a teaspoonful.
Silicate of sodium—six ounces.
Ammonia—ten drops or one-sixteenth of an ounce.
Water—five and one-half ounces.

In the manufacture of this composition it is preferable to proceed as follows:

One-sixteenth of an ounce of starch is boiled in one and one-half ounces of water until the same assumes the condition of a paste; one-half ounce of alum is dissolved in two ounces of water; one-third of an ounce of glue is boiled in one ounce of water for a period of five minutes; and six ounces of silicate of sodium are boiled for a period of two minutes.

The boiled starch and glue are then boiled and stirred together until these ingredients are well dissolved and divided. To this mixture of starch and glue is then added the previously dissolved alum, while the latter is hot. The previously boiled silicate of sodium is now added to the starch, alum and glue and thoroughly mixed therewith. This mixture comprising starch, glue, alum and silicate of sodium is now permitted to stand twenty-four hours under normal temperature in order to permit the same to season. This mixture is then strained in order to remove any lumps or large pieces therefrom, after which ten drops of ammonia and one ounce of water are added thereto and thoroughly mixed therewith while the entire mixture is being heated, thereby completing the composition ready for use.

This composition when finished is of a fluid character and can be applied to the article which is to be treated either by brushing the same thereon or dipping the article into the composition so as to produce a thin coat on the same. When applied to the textile or fabric wings of aeroplanes it is desirable to apply a plurality of coats to the surfaces to be treated and to allow an interval of time for drying between successive coats. In aeroplane work it has been found satisfactory to apply from four to five coats and permit each coat to dry about three quarters of an hour before applying the following coat.

In this composition the starch serves primarily as a filler for closing the pores or interstices in the woven fabric or other surfaces. The alum operates to shrink the fabric so that it is smooth and taut and also renders the fabric or other material practically fire-proof. The glue in the composition operates as a binder which retains the various ingredients in their divided and mixed condition so that they are most effective. The silicate of sodium preserves the cloth or other material in its natural condition, prevents deterioration thereof, and also serves to render the surface which is being treated water-proof. The ammonia acts as a solvent of the glue and also as a bleach which prevents spotting of the coated surface and also sterilizes and renders the composition as a whole non-odorous. The water facilitates the mixing of the various ingredients and also aids in rendering and maintaining the composition in a fluid condition.

This composition is very efficient for rendering the parts treated thereby proof against fire, water and deterioration and as the materials are readily available and no special skill is required for its application it permits work of this character to be protected at low cost.

I claim as my invention:

1. The hereindescribed composition of matter comprising starch, alum, glue, silicate of sodium, ammonia and water in substantially the proportions specified.

2. The hereindescribed composition of matter comprising starch one-sixteenth of an ounce, alum one-half of an ounce, glue one-third of an ounce, silicate of sodium six ounces, ammonia ten drops, and water five and one-half ounces.

Mr. CHARLES F. FROHE.